Nov. 1, 1932.  F. NEUBER ET AL  1,886,297
COOKING PLATE
Filed Dec. 22, 1930
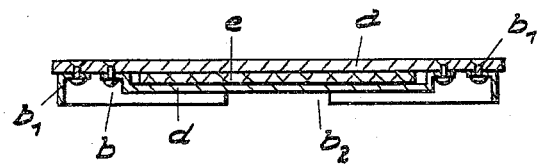
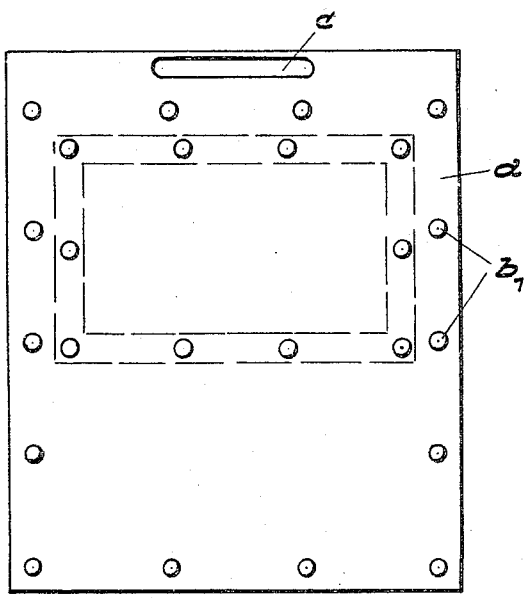

Patented Nov. 1, 1932

1,886,297

UNITED STATES PATENT OFFICE

FRIEDRICH NEUBER, THERESE NEUBER, née DREHMANN, AND LUDWIG M. HERMANN, OF HAMBURG, GERMANY

COOKING PLATE

Application filed December 22, 1930. Serial No. 504,038.

This invention relates to a cooking plate which is distinguished in that it combines an iron plate and a mica plate. Compared with the known cooking plate having a coating of asbestos and designed to avoid burning of the victuals by keeping back excessive heat by the insulating effect of the asbestos, and also burning through of the saucepan, the object of the invention is, to utilize the heat accumulating effect of the mica to accumulate the heat from only one gas flame in a plate covering the gas cooker or stove and to distribute the heat in this plate so that several saucepans or pots can be heated thereon by means of one gas flame. Besides the economy in gas all the advantages are further obtained which result from the use of asbestos cooking plates.

An embodiment of the invention is illustrated by way of example in the accompanying drawing in which:

Fig. 1 shows the cooking plate in cross-section.

Fig. 2 is a top plan view of Fig. 1.

The cooking plate is designed to be placed loosely on the gas cooker or on the kitchen range. It might however be fixed to a gas cooker or sunk in the top plate of a kitchen range. The cooking plate consists of an upper plate $a$ and of a lower plate $b^2$ fixed by rivets on the lower surface of plate $a$ and of a frame $b$ of angular cross section fixed by means of rivets $b'$ on the edge of the lower surface of the upper plate $a$. Between the lower plate $b^2$ and the upper plate $a$ a mica plate $e$ is inserted, which has the effect described above. By the interposition of a mica plate between the top plate $a$ and the bottom plate $b^2$ warping of the plate is prevented. A handle $c$ serves to facilitate the handling of the cooking plate.

We claim:—

A cooking plate, comprising in combination an upper iron plate, a lower iron plate fixed by rivets on the under side of said upper iron plate, and a mica plate inserted between said upper iron plate and said lower iron plate.

In testimony whereof we affix our signatures.

FRIEDR. NEUBER.
THERESE NEUBER, née DREHMANN.
LUDWIG M. HERMANN.